(12) United States Patent
Riccelli

(10) Patent No.: US 8,429,764 B2
(45) Date of Patent: Apr. 30, 2013

(54) COMPOSITE FABRIC MATERIAL AND APPAREL MADE THEREFROM

(76) Inventor: Joseph Riccelli, Pittsburgh, PA (US)

(*) Notice: Subject to any disclaimer, the term of this patent is extended or adjusted under 35 U.S.C. 154(b) by 371 days.

(21) Appl. No.: 12/697,551

(22) Filed: Feb. 1, 2010

(65) Prior Publication Data

US 2010/0192275 A1    Aug. 5, 2010

Related U.S. Application Data

(60) Provisional application No. 61/148,919, filed on Jan. 30, 2009.

(51) Int. Cl.
  *A41D 3/02* (2006.01)
  *B32B 3/10* (2006.01)
(52) U.S. Cl.
  USPC ............................................. 2/93; 2/69
(58) Field of Classification Search ............. 2/93, 69
  See application file for complete search history.

(56) References Cited

U.S. PATENT DOCUMENTS

| | | | |
|---|---|---|---|
| 2,976,539 A | 3/1961 | Brown, Jr. | |
| 3,067,147 A | 12/1962 | Rubens et al. | |
| 3,511,743 A | 5/1970 | Rach | |
| 3,819,543 A | 6/1974 | Stastny | |
| 4,433,494 A * | 2/1984 | Courvoisier et al. | 36/117.6 |
| 4,746,564 A | 5/1988 | Shin | |
| 4,787,100 A * | 11/1988 | Jonat | 2/80 |
| 4,929,303 A | 5/1990 | Sheth | |
| 6,206,744 B1 * | 3/2001 | Wigutow | 441/88 |
| 2006/0177645 A1 * | 8/2006 | Baychar | 428/304.4 |
| 2006/0212988 A1 * | 9/2006 | West | 2/108 |

FOREIGN PATENT DOCUMENTS

KR  1004284290000   3/2003

* cited by examiner

*Primary Examiner* — Brent O'Hern
(74) *Attorney, Agent, or Firm* — Blynn L. Shideler; Krisanne Shideler; BLK Law Group

(57) ABSTRACT

A composite fabric comprises perforated expanded low density polyethylene foam that is mechanically attached to two opposing facing layers, at least one of which outer facing layers is a non-woven material. The mechanical attachment of the perforated expanded low density polyethylene foam layer to the outer facing layers may be through stitching or quilting; through adhesive; or through thermal bonding. The composite fabric provides a textile with exceptional buoyancy, cold-resistant and water-resistant properties and which can be easily handled by conventional textile manufacturing processes.

18 Claims, 1 Drawing Sheet

COMPOSITE FABRIC MATERIAL AND APPAREL MADE THEREFROM

RELATED APPLICATION

The present invention claims priority of U.S. Provisional Patent Application Ser. No. 61/148,919 entitled "Composite Fabric Material and Apparel Made Therefrom" filed Jan. 30, 2009.

BACKGROUND OF THE INVENTION

1. Field of the Invention

The present invention relates to a breathable composite fabric material used generally in forming apparel.

2. Background Information

The term fabric, as used herein, refers to any material made through weaving, knitting, crocheting, or bonding (such as non-woven material). The words textile and cloth are used in textile assembly trades (such as tailoring and dressmaking) as synonyms for fabric. However some would provide that there are subtle differences in these terms. Some definitions of the term textile refer to any material made of interlacing fibers, while the term fabric has been defined as referring to any material made through weaving, knitting, crocheting, or bonding, and cloth has been defined as referencing a finished piece of fabric. The terms textile, cloth, fabric are used interchangeably herein. The term apparel in this application refers to clothing. Clothing, in general, is worn for safety, comfort, and modesty and to reflect religious, cultural and social meaning.

As further background for the present application, non-woven is the term used in the textile manufacturing industry to denote fabrics, such as felt, which are neither woven nor knitted. Non-woven materials are typically manufactured by putting small fibers together in the form of a sheet or web, and then binding them either mechanically, with an adhesive, or thermally such as by applying binder that may be in the form of powder, paste, or polymer melt and melting the binder onto the web by increasing temperature.

Non-woven materials are often produced from man-made fibers. Two synthetic polymers dominate the market: polypropylene (PP) and polyesters (mainly PET). Nonwovens are often application-designated as either durable or disposable. For example, nonwovens used as house-wraps to prevent water infiltration are generally considered as durable nonwovens. Nonwovens used as facings on baby diapers are generally considered as disposable or single-use nonwovens. Horticultural applications include both frost and insect protection applications.

Textile manufacturing is one of the oldest human industries. It has been suggested that the oldest known textiles date back to about 5000 B.C. The industrialization of the textile industries is often referenced as a leading or driving force in the industrial revolution. The advancement of textile manufacturing is spurred by new fabrics or fabric composites that improve the final product and/or the manufacturing process.

In regards to improvements to textile fabrics, it has been noted in U.S. Pat. No. 4,746,564, which is incorporated herein by reference, that apparel possessing buoyancy, cold-resistant and waterproof properties are highly desirable in a multitude of situations. Military personnel equipped with uniforms and jackets having all of these properties would find them advantageous in a number of situations. For example, a soldier's maneuverability in rough terrain under adverse conditions would be greatly enhanced by apparel which was both cold-resistant to protect the wearer from the elements and simultaneously facilitated crossing a river or fording a stream due to its buoyant and waterproof properties. Mountain climbers and hikers would find such garments similarly advantageous, where crossing a river, dealing with a flood, or resisting the cold are all potential encounters. To achieve their greatest utility, such garments must not only possess these various properties, but they must also be comfortable and not bulky or cumbersome.

It has been noted that water sports enthusiasts would also find such garments of particular advantage. Indeed, for many activities, garments possessing buoyant, cold-resistant and waterproof properties would be ideal and find great utility.

It is known to provide various garments with foamed materials for thermal insulation. U.S. Pat. No. 2,976,539, which is incorporated herein by reference, discloses a thermally-insulated garment having an expanded, closed-cell cellular material as a lining, preferably polyvinyl chloride. The garment is thick and cumbersome and does not possess sufficient buoyancy to support a person's weight in water.

Similarly, U.S. Pat. No. 3,511,743, which is incorporated herein by reference, discloses a thermal insulation laminate for space and diving suits whose core is an open or closed-cell sponge or foam. A fluid impermeable rubber or plastic skin is necessary. The laminate gives moderate mobility, but is still fairly cumbersome and does not have sufficient buoyancy to serve as a life-saving device.

Polyethylene foams have been suggested as insulation or fillers for life rafts and jackets. U.S. Pat. No. 3,067,147, which is incorporated herein by reference, suggests a low density polyethylene foam for such a purpose which is processed with 1,2-dichlorotetrafluoroethene as a foaming or blowing agent. The polyethylene and blowing agent are heated under pressure and explosively extruded into the atmosphere to form an expanded cellular mass. The product is bulky and cumbersome when used in practice.

Similarly, U.S. Pat. No. 3,819,543, which is incorporated herein by reference, discloses molded chlorinated, cross-linked polyethylene foam for use in producing floats and linings for clothing. Various known blowing and cross-linking agents are suggested for use by this reference. The molded products are thick and cumbersome.

U.S. Pat. Nos. 4,746,564 and 4,952,352, which are incorporated herein by reference, attempted to address these deficiencies and described a thin, lightweight material for use as a liner for garment and outdoor equipment which possesses a combination of superior buoyancy, cold-resistant and water-resistant properties, without hampering the mobility of the wearer. However, the superior properties exhibited with the fabric disclosed in these patents could not be fully utilized as these fabrics required special handling and skill in the apparel manufacturing, which greatly limited their introduction into, and adoption by, the textile industry at large. A further drawback with these solutions was essentially a complete lack of moisture vapor transmission or permeability (also generally referred to as "breathability").

It is an object of the present invention to address the deficiencies of the prior art discussed above and to provide an efficient breathable composite fabric material used generally in forming apparel that can be produced in a cost effective manner and can be easily utilized in the textile industry.

SUMMARY OF THE INVENTION

The various embodiments and examples of the present invention as presented herein are understood to be illustrative of the present invention and not restrictive thereof and are non-limiting with respect to the scope of the invention. The present invention provides a breathable composite fabric that comprises a perforated expanded low density polyethylene foam layer that is mechanically attached to two opposing nonwoven facing layers.

According to one non-limiting embodiment of the present invention, the mechanical attachment of the perforated expanded low density polyethylene foam layer to the outer facing layers is through stitching or quilting. In another non-limiting aspect of the invention the mechanical attachment of the perforated expanded low density polyethylene foam layer to the outer facing layers is through adhesive. In a further nonlimiting aspect of the invention the mechanical attachment of the perforated expanded low density polyethylene foam layer to the outer facing layers is through thermal bonding.

According to one non-limiting embodiment of the present invention, the expanded low density polyethylene foam layer is about 10-30 mils thick, generally around about 0.5 millimeters thick or about 20 mils. According to one non-limiting embodiment of the present invention, the outer facing layers are each about 2.5-10 mils thick. According to one non-limiting embodiment of the present invention, the composite fabric is about 15-50 mils thick, generally about 30-35 mils or about 0.80 millimeters.

According to one non-limiting embodiment of the invention the perforations in the expanded low density polyethylene foam layer are conical. The perforations are provided to provide a desired breathability to the composite fabric while maintaining a meaningful water resistance property. The perforations may be considered micro perforations as they maintain water resistance properties, but are sufficient to provide the desired breathability.

The composite fabric of the present invention can be easily incorporated into many types of apparel by coupling the composite fabric with any conventional outer textile fabric. The fabric liner of the present invention can form an effective and efficient inner drop liner for a jacket. In one non limiting aspect of the present invention the composite fabric is used as a liner for a ice fishing suit, Three layers of the composite fabric of the present invention are provided as the lining in an ice fishing suit, namely a jacket and bib. This construction provides buoyancy to the user sufficient to keep the user afloat, and the suit maintains a desirable breathability to maintain a sufficient comfort level to the user, and provides an exceptionally high thermal insulation property necessary for this application, all in a very lightweight apparel design.

These and other advantages of the present invention will be clarified in the description of the preferred embodiments taken together with the attached figures.

DESCRIPTION OF THE PREFERRED EMBODIMENTS

Figure 1:
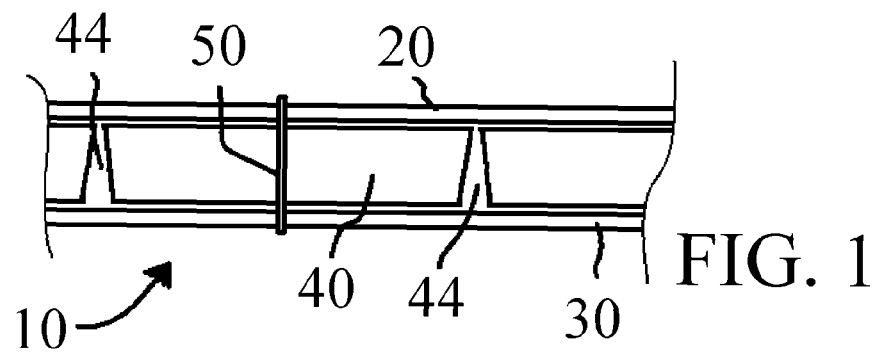
FIG. 1 is a schematic cross section of a composite fabric in accordance with one embodiment of the present invention.

In summary, the present invention relates to a light weight, breathable, composite fabric 10 with high thermal insulating properties which is provided with three integral sections or layers 20, 30 and 40 as described below. The composite fabric 10 according to the present invention will provide a textile with exceptional buoyancy, cold-resistant and water-resistant properties while providing acceptable breathability to the composite fabric and providing a fabric which can be easily handled by conventional textile manufacturing processes.

The composite fabric 10 has, in one embodiment, a total thickness of about 30-35 mils or about 0.80 millimeters, and generally has a total thickness of 15-50 millimeters. The composite fabric 10 can be cut to shape and attached to essentially any outer textile fabric in any conventional fashion, such as stitching or the like. The composite fabric 10 can form an efficient and effective inner drop liner for apparel. The composite fabric has a high thermal insulating value with a "Clo" value of approximately 2.0. The insulation of clothes are often measured with the unit "Clo", where 1 Clo=0.155 $m^2 K/W$. For background, Zero (0) Clo corresponds to a naked person, while One (1) Clo corresponds to a person wearing a typical business suit.

The first or front outer facing layer 20 of the composite fabric 10 is a reinforcing nonwoven material, such as formed from polyester or polyethylene. The thickness of the nonwoven facing layer 20 is approximately 2.5-10 mils. The outer facing layer 20 can be formed effectively of a wide variety of nonwoven material that provides the moisture vapor transition needed for most apparel applications.

The third or rear outer facing layer 30 of the composite fabric 10 is a reinforcing nonwoven material substantially identical to layer 20 and is opposed from the layer 20 as shown.

The second or intermediate layer 40 is a perforated foam layer 40, specifically, expanded low density polyethylene foam that is mechanically attached to the outer facing layers 20 and 30, such as through an attachment mechanism 50.

Low density polyethelene (LDPE) is a thermoplastic which is defined by a density range of 0.910-0.940 $g/cm^3$. It is un-reactive at room temperatures, except by strong oxidizing agents. It is known as being quite flexible, and tough. LDPE has more branching (on about 2% of the carbon atoms) than high density polyethylene (HDPE). The LDPE molecules are less tightly packed and less crystalline than HDPE because of the side branches, and thus its density is lower.

The low density polyethylene foam layer 40 can preferably be formed of Insultex® brand low density polyethylene foam sold by Innovative Designs of Pittsburgh. This type of low density polyethylene foam be made, for example, by a process comprising mixing low density polyethylene with a blowing agent, a surface activation agent and, preferably, a separation agent, heating the resultant mixture to form a softened mass, raising the temperature of the softened mass to gasify the blowing agent for foaming and expanding the cells of the polyethylene, reducing the temperature of the foamed and expanded polyethylene to partially shrink and harden the polyethylene cells, introducing a gaseous blowing agent into the polyethylene mass to cause additional foaming and expansion of the polyethylene cells, cooling the mass to a temperature suitable for cutting, cutting and heating the mass to a temperature suitable for extruding, extruding the mass, forming the mass into a sheets, and cooling the sheet or tube for a setting time to form a low density polyethylene sheet characterized by superior buoyancy and thermal resistance. A process for forming such foam is described, for example, in U.S. Pat. Nos. 4,952,352 and 4,746,564 which are incorporated herein by reference.

A further detailed process for forming such expanded polyethylene foam for layer 40 is described in Korean Patent Registration Number 10-0428429 that issued Mar. 29, 2004.

This is a more precise description of the formation of the most recent version of the Insultex® brand product which has been used to form the composite fabric of the present invention.

The process as described may be summarized as including the steps of adding a low density polyethylene (LDPE) with dual co-blowing agents, a surfactant and a release agent to form an LDPE composition. The LDPE composition is then mixed with a flame retardant and antimony oxide in a hopper container. The mixed composition is next heated in the hopper past the effective gasification temperature of the dual blowing agents (which is described as generally 120-150° C.) to form expanded beads and the hopper is then cooled. Following the expansion and cooling, the hopper is heated to an extraction temperature and the expanded product is extracted and allowed to stand at room temperature for a setting period. The expanded product can then be formed into sheets to form the layer 40 with the perforations 44 as described below. The foam layer 40 should be about 0.5 mils or about 20 mils in thickness, generally between 10 and 30 mils.

The third or intermediate LDPE foam layer 40 is a perforated, wherein a series of equally spaced perforations 44 extend through the layer 40. The perforations 44 are significant in making the composite fabric breathable for the comfort of the user. The size of the perforations 44, generally between 0.02 and 0.05 millimeters, may make the perforations considered to be micro-perforations. The micro-perforations make the composite fabric breathable while still maintaining water resistance (although no longer water proof due to the perforations and the associated vapor moisture transmission property). The breathability of the composite fabric 10 is a critical aspect of the present invention. The specific breathability can be increased or decreased by increasing or decreasing the perforation 44 density (i.e. the number of perforations 44).

The perforations 44 can be conical. However, cylindrical perforations for perforations 44 would also be acceptable. The perforations 44 can be formed on layer 40 through a perforation roller which has a series of perforation pins thereon. For the conical shaped perforations as shown the pins would have a shape similar to the final desired shape. The layer 40 can be perforated before the composite fabric 10 is assembled, or the perforations 44 can be made after the composite fabric 10 is assembled with the perforations extending through at least one and likely both outer facing layers 20 and 30. Alternatively, the layer 40 may be perforated after only one of the facing layers 20 or 30 is attached to the layer 40.

Figure 2:
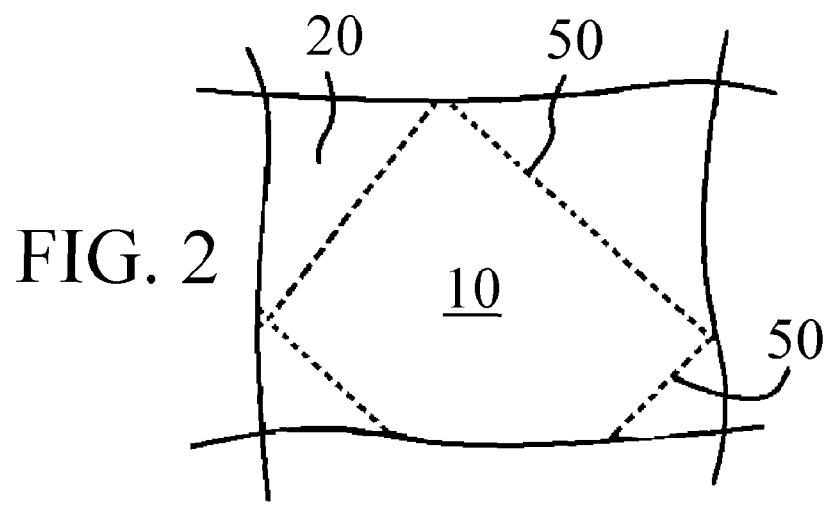
FIG. 2 is a schematic enlarged front view of the composite fabric of FIG. 1.

The attachment mechanism 50 for coupling the layers 20, 30 and 40 may be stitches in a quilting pattern as shown in FIGS. 1-2. The stitching material is conventional and the stitching pattern (quilting pattern) can be varied as desired. For example the standard diamond pattern can be increased in size or decreased, or replaced with a scalloped pattern for aesthetic or structural reasons.

Figure 3:
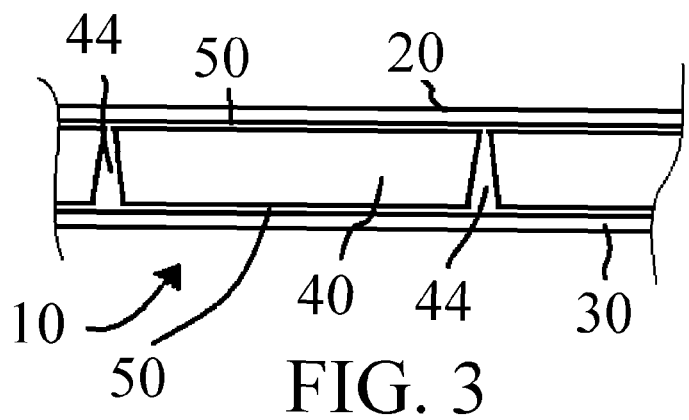
FIG. 3 is a schematic cross section of a composite fabric in accordance with another embodiment of the present invention.

Alternatively the layers 20, 30 and 40 may be bonded together through adhesives, whereby the adhesive forms the attachment mechanism 50 as shown in FIG. 3. The adhesive would have a thickness of about 1 mil, typically less than 3 mils, and can be formed of any of many standard adhesives. The adhesive layers may be across the entire surface in a lamination adhesive type arrangement or in a selected pattern such as similar to the stitching pattern disclosed above.

Alternatively the layers 20, 30 and 40 may be bonded together through thermal bonding, wherein the attachment mechanism 50 is formed by bonded elements of the respective layers. This is still considered a mechanical attachment within the meaning of this application. If utilized, it would be preferred that the melting temperature of a component of the layers 20 and 30 be lower than the layer 40 for the operation of this bonding. If the layer 40 melted prior to the outer layers 20 and 30 during this attachment it could detrimentally effect the physical properties of the resulting composite material 10.

Other mechanical attachment may be possible such as ultrasonic welding. The keys to considering acceptable attachment techniques is one that securely fastens the layers together in a structure that can be easily manipulated in conventional textile operations (e.g., it can be easily cut and sewn). Further the attachment process cannot negatively affect the desired properties of breathability, water resistance, buoyancy, and thermal insulation.

The composite fabric of the present invention can be easily incorporated into many types of apparel by coupling the composite fabric with any conventional outer textile fabric. The composite fabric 10 of the present invention is far better suited to conventional textile manufacturing techniques than prior expanded low density foam fabrics.

In one non limiting aspect of the present invention the composite fabric is used as a liner for a ice fishing suit, Three layers of the composite fabric of the present invention are provided as the lining in an ice fishing suit, namely a jacket and bib. This construction provides buoyancy to the user sufficient to keep the user afloat, and the suit maintains a desirable breathability to maintain a sufficient comfort level to the user, and provides an exceptionally high thermal insulation property (i.e. rated for sub-zero applications) necessary for this application, all in a very lightweight apparel design (i.e. the jacket is has the general bulk and weight of a "light weight" jacket).

Another application using the present invention is using the composite material 10 with an outer silk layer which results in an extremely high insulating material with very high workability and drape-ability characteristics.

Another embodiment of the present invention for silk apparel applications is formed effectively by replacing one of the facing layers 20 or 30 with a silk layer to form a distinct silk composite material formed of a non-woven layer 20 or 30 with the intermediate layer 40 and an opposite outer silk layer. This alternative silk composite material is generally for outerwear formed of silk. In conventional silk fabrics, adding insulating layers will detrimentally compromise the "drape-ability" of the resulting fabric. This modified silk composite of the present invention effectively addresses these concerns.

Whereas particular embodiments of the invention have been described above for purposes of illustration, it will be evident to those skilled in the art that numerous variations of the details of the present invention may be made without departing from the spirit and scope of the present invention.

What is claimed is:
1. An article of apparel comprising:
   A) At least one outer textile fabric; and
   B) An inner liner comprising a composite fabric, the composite fabric consisting essentially of:
      i) a perforated expanded low density polyethylene foam layer; and
      ii) a pair of outer facing layers, wherein at least one of which is formed of a nonwoven material, and wherein the perforated expanded low density polyethylene foam layer is mechanically attached to the two opposing outer facing layers.
2. An article of apparel according to claim 1 wherein the mechanical attachment of the perforated expanded low density polyethylene foam layer to the outer facing layers is through stitching.

3. An article of apparel according to claim 1 wherein the mechanical attachment of the perforated expanded low density polyethylene foam layer to the outer facing layers is through adhesive.

4. An article of apparel according to claim 1 wherein the mechanical attachment of the perforated expanded low density polyethylene foam layer to the outer facing layers is through thermal bonding.

5. An article of apparel according to claim 1 wherein the expanded low density polyethylene foam layer is about 10-30 mils thick.

6. An article of apparel according to claim 5 wherein the mechanical attachment of the perforated expanded low density polyethylene foam layer to the outer facing layers is through stitching.

7. The article of apparel according to claim 1 wherein the apparel is a jacket.

8. An article of apparel according to claim 1 wherein the outer facing layers are each about 2.5-10 mils thick.

9. An article of apparel according to claim 8 wherein the composite fabric is about 15-50 mils thick.

10. An article of apparel according to claim 1 wherein the wherein each of the pair of outer facing layers is formed of a nonwoven material.

11. An article of apparel according to claim 1 wherein the perforations in the expanded low density polyethylene foam layer are conical.

12. An article of apparel according to claim 7 wherein the expanded low density polyethylene foam layer is about 0.5 millimeters thick.

13. An article of apparel according to claim 12 wherein the mechanical attachment of the perforated expanded low density polyethylene foam layer to the outer facing layers is through stitching.

14. An article of apparel according to claim 7 wherein the composite fabric is about 0.8 millimeters thick.

15. An article of apparel according to claim 14 wherein the expanded low density polyethylene foam layer is about 0.5 millimeters thick.

16. An article of apparel according to claim 14 wherein the perforations in the expanded low density polyethylene foam layer are conical.

17. The article of apparel according to claim 1 wherein the composite fabric is about 0.8 millimeters thick.

18. The article of apparel according to claim 1 wherein the expanded low density polyethylene foam layer is about 0.5 millimeters thick.

* * * * *